(12) United States Patent
Mukaihara et al.

(10) Patent No.: US 7,233,611 B2
(45) Date of Patent: Jun. 19, 2007

(54) DIODE-PUMPED SOLID-STATE LASER DEVICE AND MANUFACTURING METHOD OF THE SAME

(75) Inventors: Katsuji Mukaihara, Tokyo (JP); Masaki Tsunekane, Tokyo (JP)

(73) Assignee: Laserfront Technologies, Inc., Kanagawa (JP)

( * ) Notice: Subject to any disclaimer, the term of this patent is extended or adjusted under 35 U.S.C. 154(b) by 227 days.

(21) Appl. No.: 10/715,553

(22) Filed: Nov. 19, 2003

(65) Prior Publication Data

US 2004/0101004 A1 May 27, 2004

(30) Foreign Application Priority Data

Nov. 27, 2002 (JP) ............................. 2002-344134

(51) Int. Cl.
*H01S 3/093* (2006.01)

(52) U.S. Cl. .......................................... 372/72; 372/70

(58) Field of Classification Search ................. 372/34, 372/87, 75, 33; 359/345
See application file for complete search history.

(56) References Cited

U.S. PATENT DOCUMENTS

| | | | |
|---|---|---|---|
| 5,033,058 A | 7/1991 | Cabaret et al. | |
| 5,471,491 A * | 11/1995 | Phillips et al. | 372/35 |
| 5,636,239 A * | 6/1997 | Bruesselbach et al. | 372/70 |
| 5,796,770 A | 8/1998 | Gregor et al. | |
| 5,978,407 A * | 11/1999 | Chang et al. | 372/72 |
| 6,282,217 B1 * | 8/2001 | Takase | 372/35 |
| 6,594,299 B1 * | 7/2003 | Hirano et al. | 372/75 |
| 6,621,849 B1 * | 9/2003 | Thro et al. | 372/99 |
| 6,704,341 B1 * | 3/2004 | Chang | 372/70 |

FOREIGN PATENT DOCUMENTS

| | | |
|---|---|---|
| DE | 101 39 980 A1 | 3/2003 |
| EP | 0 867 988 A2 | 9/1998 |
| EP | 1 128 505 A2 | 8/2001 |
| JP | 2001-244526 * | 9/2001 |

* cited by examiner

*Primary Examiner*—Minsun Oh Harvey
*Assistant Examiner*—Tuan N. Nguyen
(74) *Attorney, Agent, or Firm*—Dickstein Shapiro LLP

(57) ABSTRACT

A conventional method for a solid-state laser device that obtains a laser beam output of a high quality at a high output using a laser diode as a pumping light source has a problem that the costs are increased and the fabrication becomes complicated due to an increasing number of components, such as a diffusing reflection mirror, a condenser lens, and a holding mechanism and a cooling mechanism thereof. Coating with a antireflection coating to reduce a transmission loss of laser diode light, and coating with a high reflection coating to reflect the laser diode light are provided alternately on the outer surface of a cooling tube. Also, an irradiation direction of the laser diode is not directed to the center of the laser rod, but is given with a certain angle to be positively tilted. This configuration makes it possible to eliminate the above problem.

4 Claims, 7 Drawing Sheets

DIODE-PUMPED SOLID-STATE LASER DEVICE AND MANUFACTURING METHOD OF THE SAME

BACKGROUND OF THE INVENTION

1. Field of the Invention

The present invention relates to a diode-pumped solid-state laser device and a manufacturing method of the same.

2. Description of the Related Prior Art

For a diode-pumped solid-state laser device to obtain a laser beam of a high beam quality at a high output, it is necessary to achieve a homogeneous distribution of pumping light within a laser rod across the cross section of the rod. For example, when the distribution of pumping light within the laser rod makes a profile with the center of the rod being higher, the thermal lensing effect in the laser rod becomes greater, which raises problems, such as saturation of a laser output, deterioration in the quality of a laser beam profile, and damage in the laser rod. Conventionally, the optical diffusing and condensing method has been proposed in order to achieve a homogenous pumping distribution within the laser rod.

Figure 1:
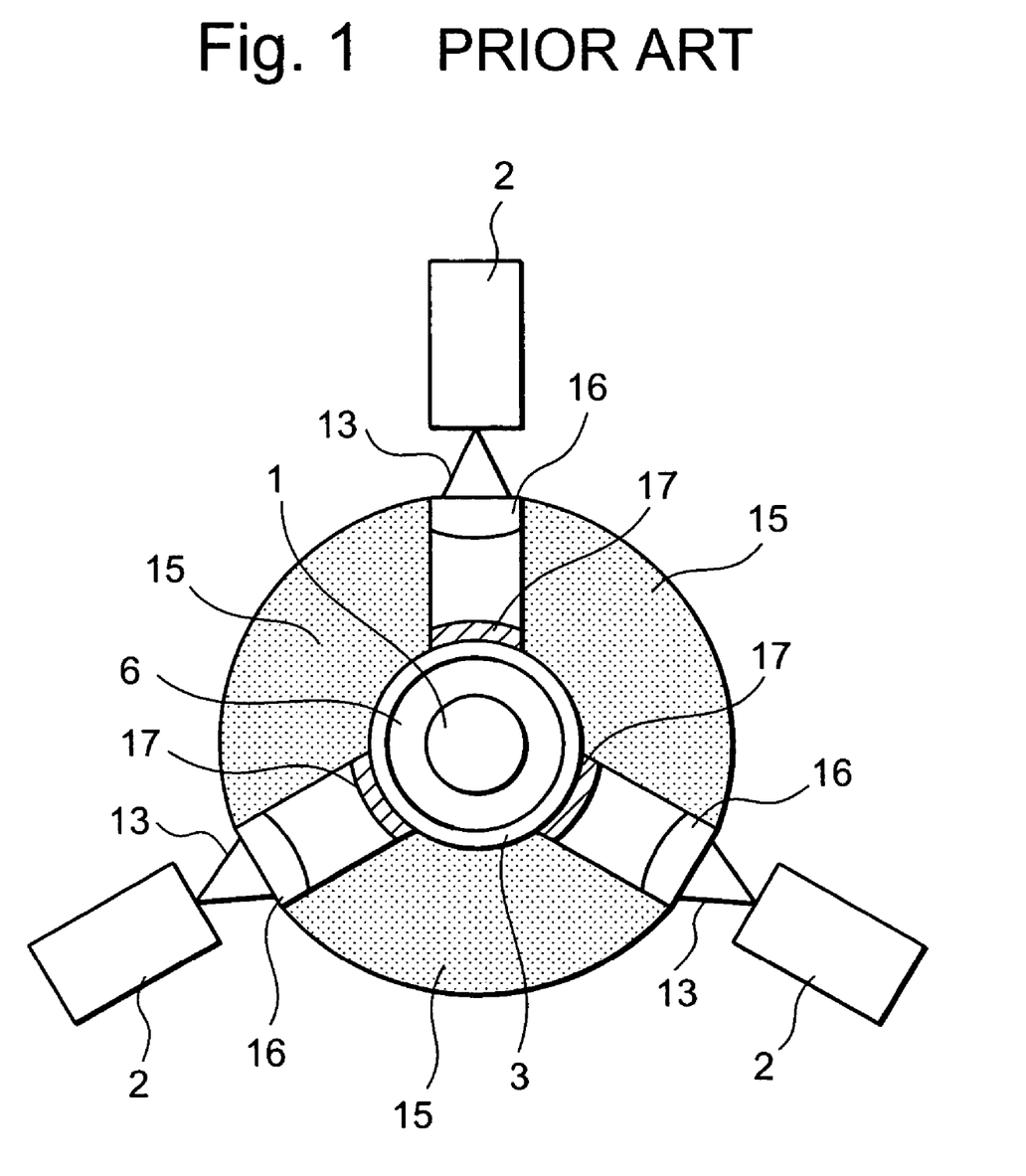
FIG. 1 is a diagram showing a cross section of a conventional diode-pumped solid-state laser device.

FIG. 1 shows a cross section of a conventional diode-pumped solid-state laser device. A cooling tube 3 is placed outside a laser rod 1. Cooling water 6 flows through a space between the laser rod 1 and the cooling tube 3, and directly cools the laser rod 1 and a rod holder. Pumping laser diodes (hereinafter, abbreviated to LDs) 2 are placed outside the cooling tube 3, and side-pump the laser rod 1 through antireflection coating 17. An optical diffusing reflector 15 is provided outside to come in close contact with the cooling tube 3. The optical diffusing reflector 15 is made of a material, such as ceramic, and the surface coming in close contact with the cooling tube 3 is made rough to form a diffusing reflection mirror. The diffusing reflection mirror reflects LD light 13 randomly to be absorbed homogeneously into the laser rod 1.

However, because the LD light 13 heats the optical diffusing reflector 15, there arises a problem that heat damages the diffusing reflection mirror. In order to prevent damage on the diffusing reflection mirror, the optical diffusing reflector 15 has to be cooled by cooling water which is fed through holes. The optical diffusing reflector 15, however, increases in thickness due to the need to provide the cooling holes, which in turn increases a distance between the pumping LDs 2 and the laser rod 1. It is therefore necessary to provide lenses 16 to make the LD light 13 focus to the laser rod 1 efficiently. As has been described, the conventional method has a problem that costs are increased and the fabrication becomes complicated due to plural components, such as the optical diffusing reflector, the condenser lenses, a holding mechanism and a cooling mechanism of the optical diffusing reflector.

There has been disclosed a diode-pumped solid-state laser device configured to include, instead of the optical diffusing reflector, a cylindrical member provided outside and coaxially with the cooling tube and having a high reflection coating on the inner surface and pumping LD light-introducing slits on the side surface, so that pumping LD light is reflected on the reflection coating on the inner surface of the cylindrical member (see, for example, Japanese Laid-Open Patent Application No. 2001-244526).

With the technique disclosed in the aforementioned publication, however, a patterned reflection coating has to be provided on the inner surface of the cylindrical member which is a difficult fabricating method. Moreover, it is necessary to adjust in such a manner that pumping LD light that goes incident on the cylindrical member will be reflected on the reflection coating on the inner surface of the cylindrical member and returned to the incident position again (referred to as the condition for direct reflection in the aforementioned publication), which makes it quite difficult to align the pumping LDs. For the reasons described above, the diode-pumped solid-state laser device manufactured with the use of the disclosed technique has a drawback that the costs are increased as a matter of course.

SUMMARY OF THE INVENTION

The present invention was devised in view of the problems of the prior art described above, and therefore has an object to provide a highly reliable and inexpensive diode-pumped solid-state laser device with high output and high quality laser beam by pumping the laser rod efficiently, and a manufacturing method of the same.

In order to achieve the above and other objects, a diode-pumped solid-state laser device of the present invention is a diode-pumped solid-state laser device used to side-pump a laser rod, wherein: a cooling tube to cool the laser rod with the use of flowing water is provided coaxially so as to surround the laser rod; and the cooling tube is provided with a antireflection area for pumping light on a portion of an outer surface thereof, and with a high reflection area for the pumping light on another portion of the outer surface on which the antireflection area is absent.

Further, a pumping laser diode is placed in such a manner so as to prevent an optical axis of the pumping light that passes through the antireflection area and goes incident on the laser rod from intersecting with a central axis of the laser rod.

The antireflection area is provided to a plurality of places along a circumferential direction of the outer surface.

The antireflection area is provided to the plurality of places at equal intervals along the circumferential direction.

The antireflection area comprises a anti-reflection coating, and the high reflection area comprises a high reflection coating.

Further, the high reflection coating is covered with the anti-reflection coating, or the antireflection area includes the anti-reflection coating alone and the high reflection area includes the high reflection coating on the anti-reflection coating.

Furthermore, a scattering surface is provided on an inner surface of the cooling tube, or on an outer surface of the high reflection area.

A manufacturing method of a diode-pumped solid-state laser device of the invention is a manufacturing method of a diode-pumped solid-state laser device used to side-pump a laser rod, in which a cooling tube to cool the laser rod with the use of flowing water is provided coaxially so as to surround the laser rod, and the method includes: a step of providing the cooling tube with a antireflection area for pumping light on a portion of an outer surface thereof; and a step of providing the cooling tube with a high reflection area for the pumping light on another portion of the outer surface on which the antireflection area is absent.

The method further includes a step of placing a pumping laser diode in such a manner so as to prevent an optical axis of the pumping light that passes through the antireflection area and goes incident on the laser rod from intersecting with a central axis of the laser rod.

The antireflection area is provided to a plurality of places along a circumferential direction of the outer surface.

The antireflection area is provided to the plurality of places at equal intervals along the circumferential direction.

The antireflection area comprises an anti-reflection coating, and the high reflection area comprises a high reflection coating.

Further, the high reflection coating is covered with the antireflection coating, or the antireflection area includes the antireflection coating alone and the high reflection area includes the high reflection coating on the antireflection coating.

The method further includes a step of providing a scattering surface on an inner surface of the cooling tube, or on an outer surface of the high reflection area.

According to the present invention, the diode-pumped solid-state laser device of the present invention has a simple configuration including a pumping LD, a cooling tube, and a laser rod, and on the outer surface of the cooling tube are provided a antireflection coating to reduce a transmission loss in each ray of LD light and a high reflection coating to allow LD light having passed through the laser rod without being absorbed therein to be absorbed in the laser rod again, alternately in a stripe fashion and in the longitudinal direction of the laser rod, while the pumping LD pumps the laser rod with the optical axis thereof being positively tilted with respect to the center of the laser rod. It is thus possible to pump the laser rod efficiently, and as a consequence, a highly reliable, inexpensive laser with a high output and a high beam quality can be obtained.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENTS

Embodiments of the present invention will now be described with reference to the drawings.

Figure 2:
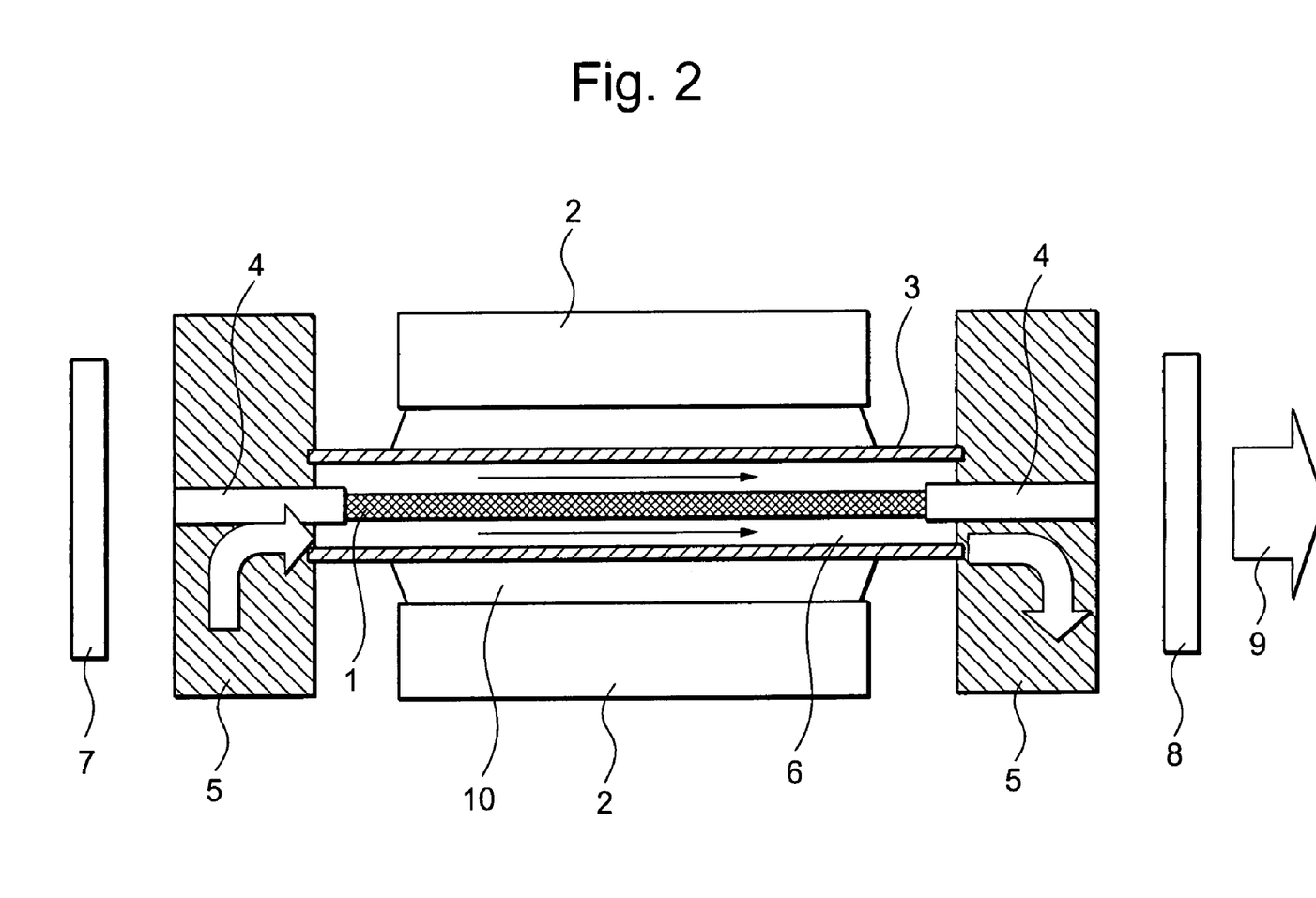
FIG. 2 is a diagram of a diode-pumped solid-state laser device of the present invention, showing a cross section along the axis of a laser rod.

FIG. 2 is a schematic view of a diode-pumped solid-state laser device, which is a cross-sectional diagram along the axis of a laser rod. A laser rod 1 is held by a rod holder 4 and is fixed to a flange 5. A cooling tube 3 is placed outside the laser rod 1 and is also fixed to the flange 5. Cooling water 6 flows through a clearance between the laser rod 1 and the cooling tube 3, and directly cools the laser rod 1 and the rod holder 4. Pumping laser diodes (hereinafter, abbreviated to LDs) 2 are placed outside the cooling tube 3, and LD light 10 side-pumps the laser rod 1. A reflection mirror 7 and an output mirror 8 are placed in parallel with the end faces of the laser rod 1, and laser light 9 that has resonated between the two mirrors is irradiated.

Figure 3:
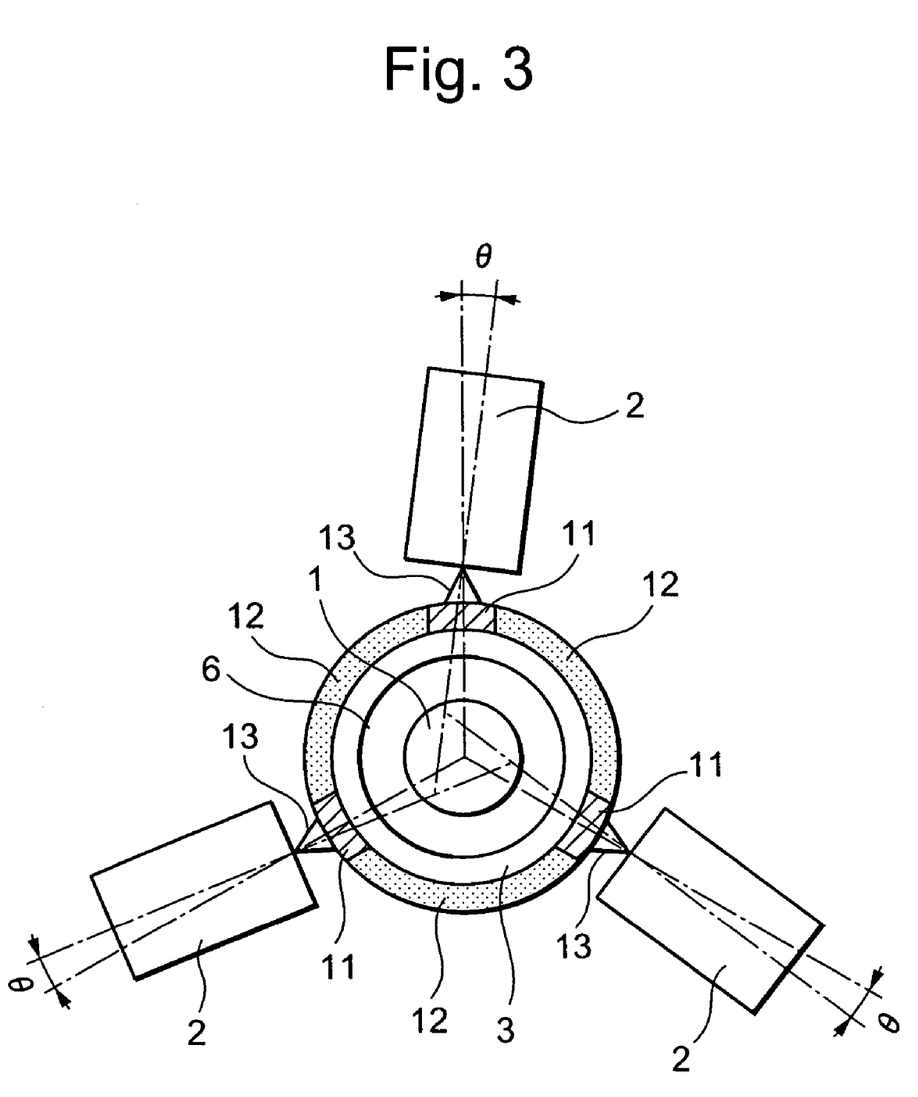
FIG. 3 is a diagram of a first embodiment of the diode-pumped solid-state laser device of the present invention, showing a cross section normal to the axis of the laser rod.

FIG. 3 is a diagram of a first embodiment of the diode-pumped solid-state laser device of the present invention, showing a cross section normal to the axis of the laser rod 1. Herein, three pumping LDs 2 are placed at regular angular interval of 120° within the cross section of the laser rod 1. However, as many pumping LDs 2 as are structurally permissible, for example, 4 or 5 pumping LDs 2, may be placed. Alternatively, a number of pumping LDs 2 may be provided in a spiral fashion along the axis of the laser rod 1.

The outer surface of the cooling tube 3 is coated with an antireflection coating 11 and a high reflection coating 12, which are provided alternately along the circumferential direction and in a stripe fashion in the longitudinal direction of the laser rod 1. The antireflection coating 11 reduces a transmission loss in each ray of LD light 13. The high reflection coating 12 reflects LD light 13 that has passed through the laser rod 1 without being absorbed therein back to the laser rod 1 again to be absorbed therein.

Also, in a case where a number of pumping LDs 2 are provided along the axis of the laser rod 1 in a spiral fashion, the stripes of the antireflection coating 11 and the high reflection coating 12 are also provided in a spiral fashion.

Each pumping LD 2 pumps the laser rod 1 with the optical axis of the irradiated light 13 being positively tilted by $\theta$ with respect to the center of the laser rod 1.

The cooling water 6 flows through a clearance between the laser rod 1 and the cooling tube 3.

As has been described, the high reflection coating 12 is provided on the outer surface of the cooling tube 3, and the optical axis of the pumping light 13 is set to an tilted position to allow the pumping light 13 to pass through the laser rod 1 while avoiding the center thereof. Hence, pumping light that has passed through the laser rod 1 without being absorbed therein is reflected on the high reflection coating 12, and passes through the laser rod 1 again along an optical path different from the incident optical axis. Further, the pumping light that has been reflected and passed through the laser rod 1 again without being absorbed therein is reflected on another stripe of the high reflection coating 12 once again. Hence, a trace of an optical path of the pumping light within the cooling tube 3 is shaped like a star drawn with a single stroke of the brush. In other words, portions of the high reflection coating 12 on the outer surface of the cooling tube 3 play a role of an integrating sphere. The residual pumping light that has not been absorbed in the laser rod 1 therefore passes through the laser rod 1 more than once. Hence, the whole energy of the pumping light is eventually absorbed in the laser rod 1, which enables efficient pumping to take place.

Different from the prior art, by which the cylindrical member is placed outside the cooling tube and a patterned high reflection coating or the like is further provided on the inner surface thereof, it is sufficient, for the configuration of the first embodiment of the diode-pumped solid-state laser device of the present invention shown in FIG. 3, to provide a high reflection coating on the outer surface of the cooling tube itself. This makes the fabrication remarkably easier, which in turn saves the costs.

In the embodiment described above, the stripes of the high reflection coating 12 and the stripes of the antireflection coating 11 are provided alternately on the outer surface of the cooling tube 3. It should be appreciated, however, that the invention is not limited to this configuration.

Figure 4:
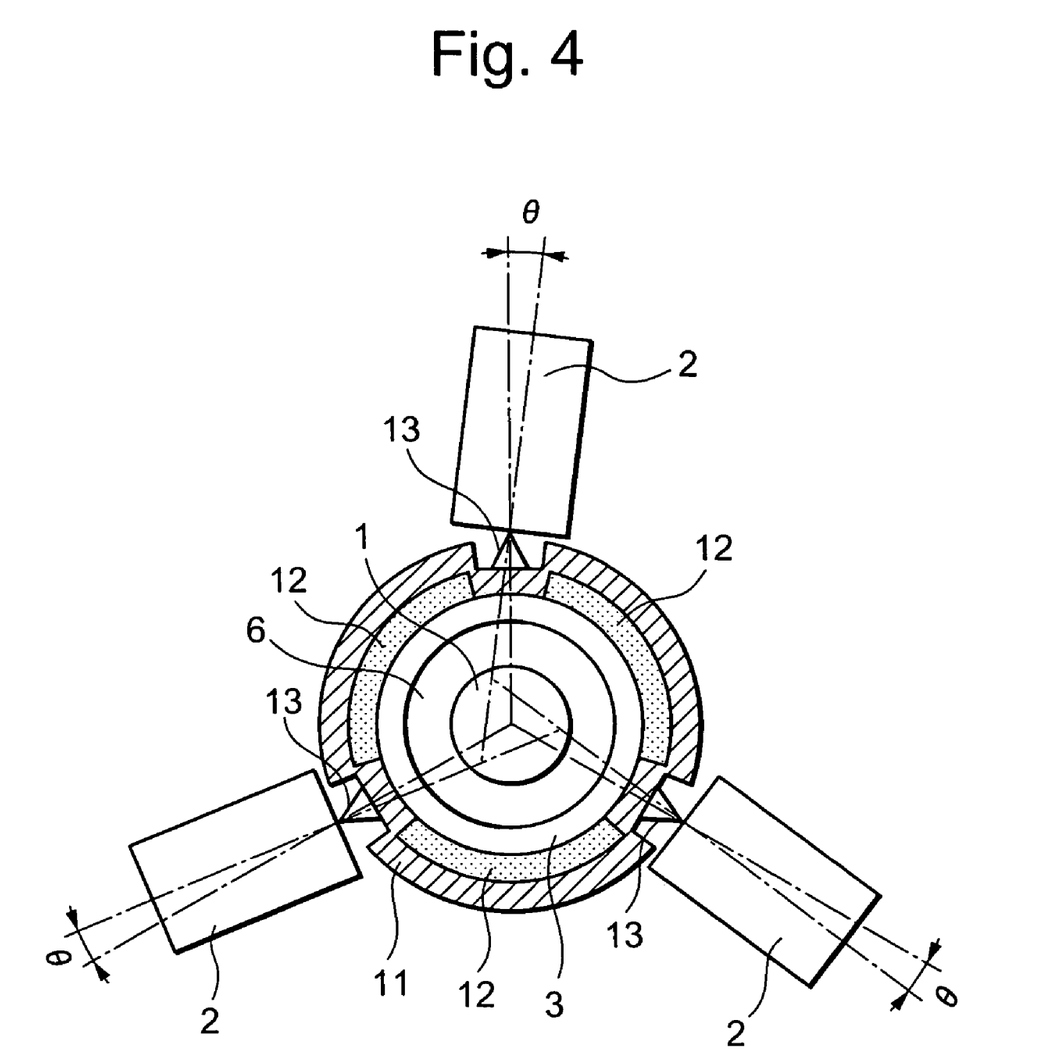
FIG. 4 is a diagram of a second embodiment of the diode-pumped solid-state laser device of the present invention, showing a cross section normal to the axis of the laser rod.

To be more specific, the antireflection coating 11 and the high reflection coating 12 may be provided as in the configuration of a second embodiment of the diode-pumped solid-state laser device of the present invention shown in FIG. 4. That is, coating with the high reflection coating 12 is provided to the outer surface of the cooling tube 3 in a stripe fashion and in the longitudinal direction of the laser rod 1 first, and thence coating with the antireflection coating 11 is provided to cover the entire outer surface of the cooling tube 3 including the surface of the high reflection coating 12.

Figure 5:
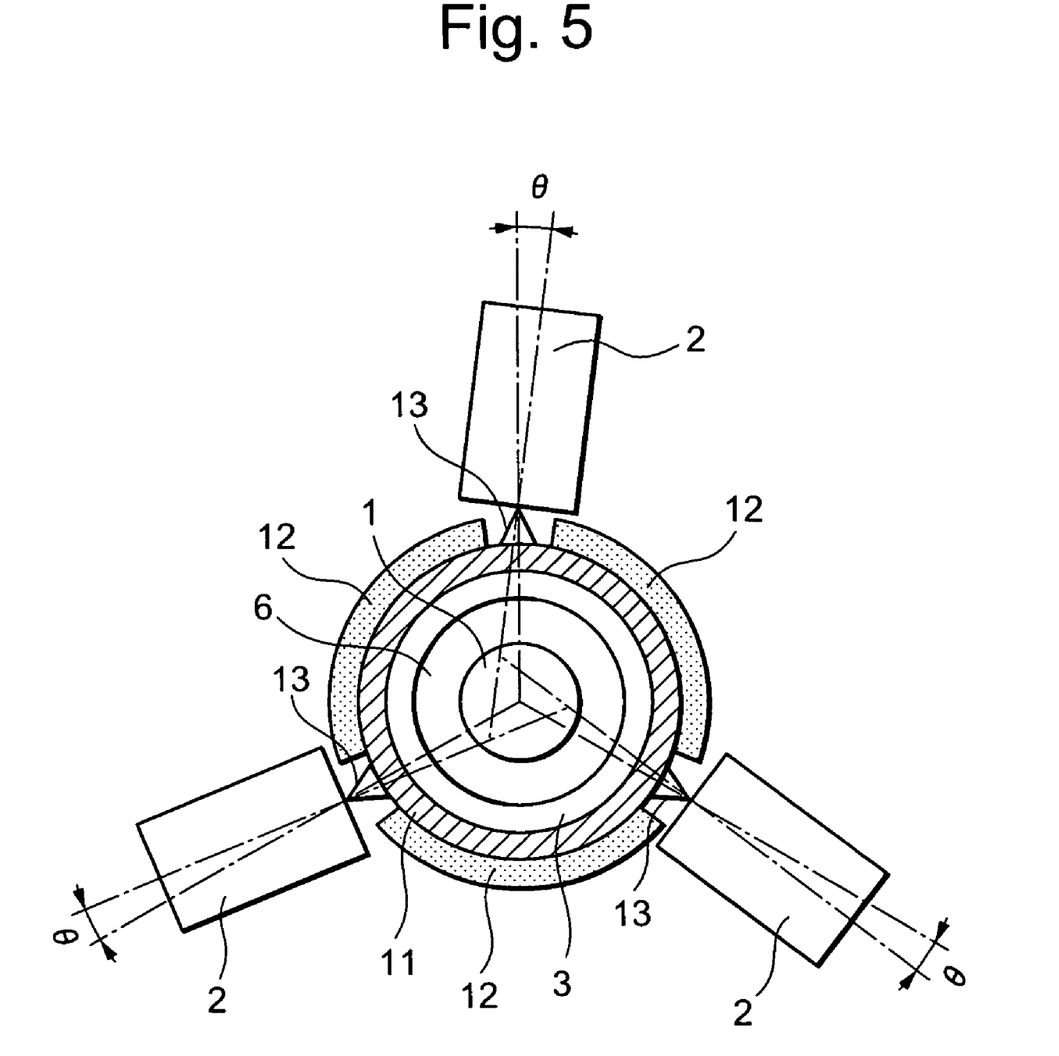
FIG. 5 is a diagram of a third embodiment of the diode-pumped solid-state laser device of the present invention, showing a cross section normal to the axis of the laser rod.

Further, the antireflection coating 11 and the high reflection coating 12 may be provided as in the configuration of a third embodiment of the diode-pumped solid-state laser device of the present invention shown in FIG. 5. That is, coating with the antireflection coating 11 is provided across the entire outer surface of the cooling tube 3 first, and thence coating with the high reflection coating 12 is provided on the outer surface of the antireflection coating 11 in a stripe fashion and in the longitudinal direction of the laser rod 1.

By adopting the configuration in any of the first through third embodiments above, the LD light irradiated from each pumping LD passes through the antireflection coating on the cooling tube with a little loss, and is thereby absorbed into the laser rod efficiently. The LD light that has passed through the laser rod without being absorbed therein is reflected on the high reflection coating provided on the surface opposite to the cooling tube and is returned to the laser rod again to be absorbed therein. It is thus possible to allow the pumping light to be absorbed in the laser rod efficiently.

Also, by tilting the irradiation direction of the LD light positively with respect to the center of the laser rod, the pumping distribution within the laser rod approximates to a homogeneous state. A laser with a high output and a high beam quality can be thus obtained.

A configuration of a fourth embodiment of the diode-pumped solid-state laser device of the present invention will now be described with reference to FIG. 6.

On the outer surface of the cooling tube 3 are provided the antireflection coating 11 to reduce a transmission loss in each ray of LD light 13 and the high reflection coating 12 to allow the LD light 13 that has passed through the laser rod 1 without being absorbed therein to be absorbed into the laser rod 1 again, alternately along the circumferential direction and in a stripe fashion in the longitudinal direction of the laser rod 1. A diffusing surface 14 having a certain roughness (irregularities) has been provided on the side surface of the laser rod 1 on which the high reflection coating 12 is to be provided, so that coating with the high reflection coating 12 is provided on the surface of the diffusing surface 14.

Each pumping LD 2 pumps the laser rod 1 with the optical axis of the irradiation light 13 being positively tilted by $\theta$ with respect to the center of the laser rod 1.

The cooling water 6 flows through a clearance between the laser rod 1 and the cooling tube 3.

Figure 6:
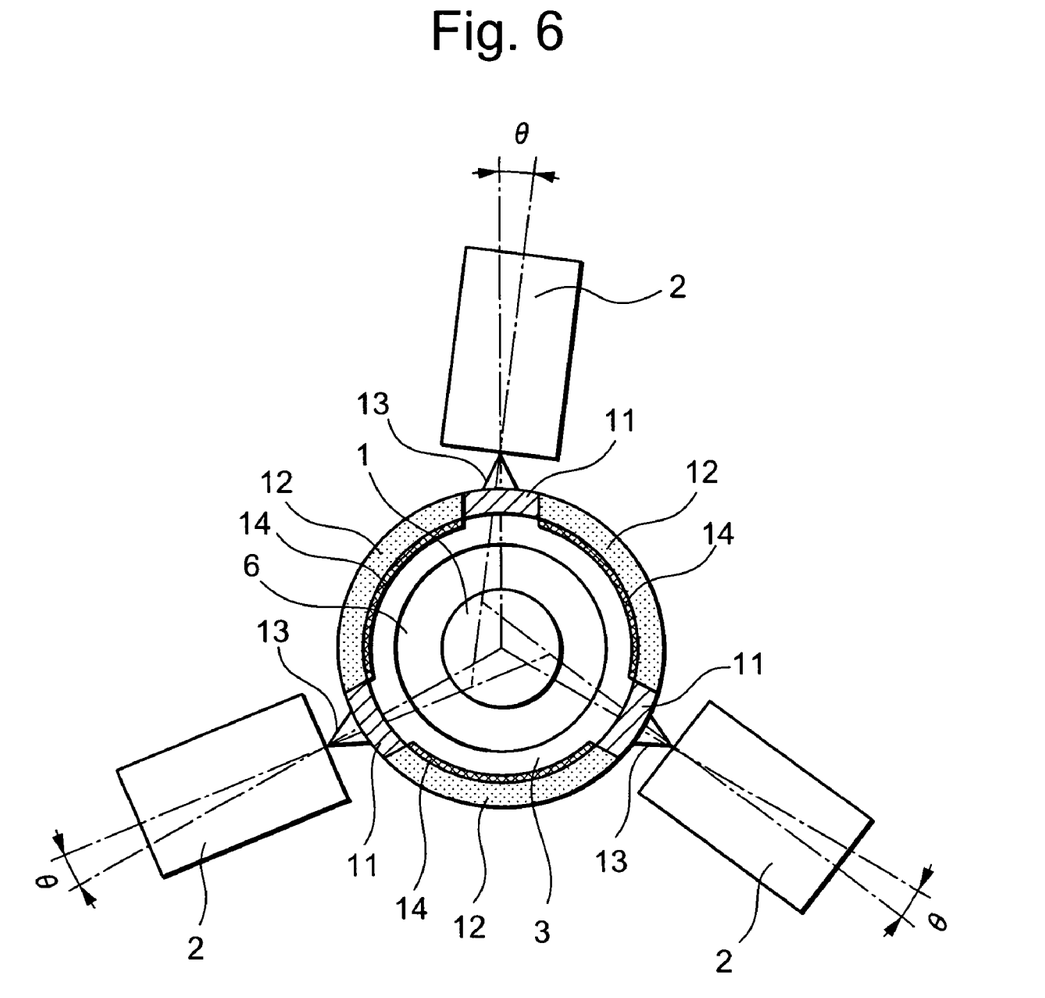
FIG. 6 is a diagram of a fourth embodiment of the diode-pumped solid-state laser device of the present invention, showing a cross section normal to the axis of the laser rod.
Figure 7:
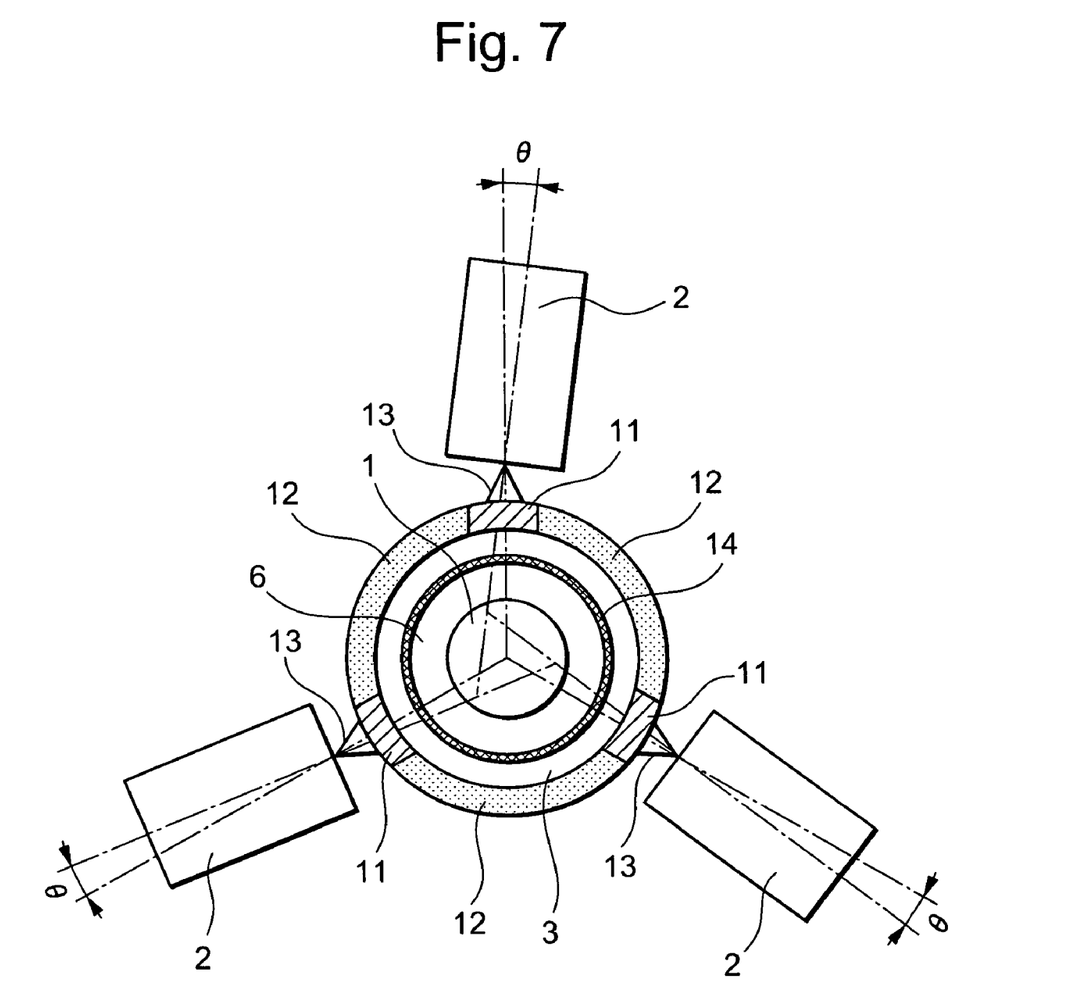
FIG. 7 is a diagram of a fifth embodiment of the diode-pumped solid-state laser device of the present invention, showing a cross section normal to the axis of the laser rod.

The configuration of the fourth embodiment shown in FIG. 6 may be modified to the configuration of a fifth embodiment of the diode-pumped solid-state laser device of the present invention shown in FIG. 7. That is, the diffusing surface 14 may be provided across the entire inner surface of the cooling tube 3. Providing irregularities across the entire inner surface of the tube is far easier than the prior art, by which a patterned high reflection coating, such as a metal film, is provided on the inner surface.

By adopting the configuration of the fourth or fifth embodiment above, the LD light irradiated from the pumping LD passes through the antireflection coating with a little loss, and is thereby absorbed into the laser rod efficiently. The LD light that has passed through the laser rod without being absorbed therein is reflected on the high reflection coating and returned to the laser rod again to be absorbed therein. Because the LD light is reflected on the diffusing surface when being reflected on the high reflection coating, the reflected LD light is absorbed into the laser rod without becoming incoherent and causing interference. This allows the pumping distribution within the laser rod to approximate to a homogeneous state, and as a consequence, a laser with a high output and a high beam quality can be obtained.

The antireflection coating 11 and the high reflection coating 12 used in the fourth embodiment or the fifth embodiment may be provided through the coating method described in either the second embodiment or the third embodiment.

It is effective to secure a large interval between the surface of the cooling tube 3 and each pumping LD 2 in all the embodiments described above. When a distance between the pumping LD and the laser rod is large, the LD light goes incident on the laser rod while being expanded spatially, and the pumping distribution within the laser rod becomes more homogeneous. It is thus possible to obtain a laser with a higher beam quality.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the sprit and the scope of the following claims.

What is claimed is:

1. A diode-pumped solid-state laser device used to side-pump a laser rod, wherein:
   a cooling tube to cool said laser rod with the use of flowing water is provided coaxially so as to surround said laser rod; and
   said cooling tube is provided with an antireflection area for pumping light on a portion of an outer surface thereof, and with a high reflection area for the pumping light on another portion of the outer surface on which said antireflection area is absent wherein the antireflection area is not a hole through the cooling tube;
   wherein a pumping laser diode is placed in such a manner so as to prevent an optical axis of the, pumping light that passes through said antireflection area and goes incident on said laser rod from intersecting with a central axis of said laser rod;
   wherein said antireflection area is provided to a plurality of places along a circumferential direction of said outer surface;
   wherein said antireflection area comprises an antireflection coating; and said high reflection area comprises a high reflection coating; and
   wherein said high reflection coating is covered with said antireflection coating.

2. A diode-pumped solid-state laser device used to side-pump a laser rod, wherein:
   a cooling tube to cool said laser rod with the use of flowing water is provided coaxially so as to surround said laser rod; and said cooling tube is provided with an antireflection area for pumping light on a portion of an outer surface thereof, and with a high reflection area for the pumping light on another portion of the outer surface on which said antireflection area is absent wherein the antireflection area is not a hole through the cooling tube;

wherein a pumping laser diode is placed in such a manner so as to prevent an optical axis of the, pumping light that passes through said antireflection area and goes incident on said laser rod from intersecting with a central axis of said laser rod;

wherein said antireflection area is provided to a plurality of places along a circumferential direction of said outer surface;

wherein said antireflection area comprises an antireflection coating; and said high reflection area comprises a high reflection coating; and wherein said antireflection area includes said antireflection coating alone; and said high reflection area includes said high reflection coating on said antireflection coating.

3. A manufacturing method of a diode-pumped solid-state laser device used to side-pump a laser rod, in which a cooling tube to cool said laser rod with the use of flowing water is provided coaxially so as to surround said laser rod, said method comprising:

a step of providing said cooling tube with an antireflection area for pumping light on a portion of an outer surface thereof, the antireflection area is not being a hole through the cooling tube; and a step of providing said cooling tube with a high reflection area for the pumping light on another portion of the outer surface on which said antireflection area is absent;

further comprising a step of placing a pumping laser diode in such a manner so as to prevent an optical axis of the pumping light that passes through said antireflection area and goes incident on said laser rod from intersecting with a central axis of said laser rod;

wherein said antireflection area is provided to a plurality of places along a circumferential direction of said outer surface;

wherein said antireflection area comprises an anti-reflection coating said high reflection area comprises a high reflection coating; and wherein said high reflection coating is covered with said anti-reflection coating.

4. A manufacturing method of a diode-pumped solid-state laser device used to side-pump a laser rod, in which a cooling tube to cool said laser rod with the use of flowing water is provided coaxially so as to surround said laser rod, said method comprising:

a step of providing said cooling tube with an antireflection area for pumping light on a portion of an outer surface thereof, the antireflection area is not being a hole through the cooling tube; and a step of providing said cooling tube with a high reflection area for the pumping light on another portion of the outer surface on which said antireflection area is absent;

further comprising a step of placing a pumping laser diode in such a manner so as to prevent an optical axis of the Pumping light that passes through said antireflection area and goes incident on said laser rod from intersecting with a central axis of said laser rod;

wherein said antireflection area is provided to a plurality of places along a circumferential direction of said outer surface;

wherein said antireflection area comprises an anti-reflection coating said high reflection area comprises a high reflection coating;

wherein said antireflection area includes said anti-reflection coating alone; and said high reflection area includes said high reflection coating on said anti-reflection coating.

* * * * *